(12) United States Patent
Lee et al.

(10) Patent No.: US 9,435,508 B2
(45) Date of Patent: Sep. 6, 2016

(54) LIGHTING DEVICE

(75) Inventors: Dong Hyun Lee, Seoul (KR); Dong Mug Seong, Seoul (KR); Jun Phill Eom, Seoul (KR); Beom Sun Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 224 days.

(21) Appl. No.: 14/232,531

(22) PCT Filed: Jul. 6, 2012

(86) PCT No.: PCT/KR2012/005361
§ 371 (c)(1),
(2), (4) Date: Jan. 13, 2014

(87) PCT Pub. No.: WO2013/009039
PCT Pub. Date: Jan. 17, 2013

(65) Prior Publication Data
US 2014/0168993 A1    Jun. 19, 2014

(30) Foreign Application Priority Data

Jul. 11, 2011 (KR) .......... 10-2011-0068605

(51) Int. Cl.
F21V 3/00    (2015.01)
F21V 5/04    (2006.01)
F21V 5/00    (2015.01)
F21S 8/04    (2006.01)
(Continued)

(52) U.S. Cl.
CPC ............ *F21V 5/04* (2013.01); *F21V 5/004* (2013.01); *F21S 8/04* (2013.01); *F21Y 2105/00* (2013.01); *G02B 3/0056* (2013.01); *G02B 5/0278* (2013.01)

(58) Field of Classification Search
CPC .... F21K 9/135; F21K 9/1355; F21V 29/507; F21V 29/89; F21V 5/004; F21V 5/007
USPC ............................................ 362/331
See application file for complete search history.

(56) References Cited

U.S. PATENT DOCUMENTS 6,871,982 B2    3/2005  Holman et al.
8,177,382 B2 *  5/2012  Roberts ............ G02F 1/133608
                                              362/616
(Continued)

FOREIGN PATENT DOCUMENTS

CN    101283294 A    10/2008
CN    103649621 A    3/2014
(Continued)

OTHER PUBLICATIONS

Office Action dated Dec. 1, 2014 in Taiwanese Application No. TW-20120124383.
(Continued)

*Primary Examiner* — Ali Alavi
(74) *Attorney, Agent, or Firm* — Saliwanchik, Lloyd & Eisenschenk

(57) ABSTRACT

Disclosed is a light device comprising: a diffusion unit for diffusing and radiating light incident from a light source; and a condensing unit installed on a light radiating surface of the diffusion unit, including a micro lens array of lenses having sag determined depending on one of a light emitting area of the lighting device and total light flux of the lighting device. Thus, the lighting device can reduce a light flux emitted at the angle between 65 deg and 90 deg, thereby meeting UGR conditions.

19 Claims, 9 Drawing Sheets

(51) Int. Cl.
G02B 3/00 (2006.01)
G02B 5/02 (2006.01)
F21Y 105/00 (2016.01)

(56) References Cited

U.S. PATENT DOCUMENTS

| | | | |
|---|---|---|---|
| 9,173,269 B2* | 10/2015 | Maxik | H05B 33/0869 |
| 2006/0291239 A1* | 12/2006 | Hasei | G02B 3/0012 |
| | | | 362/600 |
| 2007/0025121 A1* | 2/2007 | Harada | G02B 5/0242 |
| | | | 362/607 |
| 2007/0081254 A1 | 4/2007 | Endle et al. | |
| 2007/0297062 A1* | 12/2007 | Park | G02B 3/0043 |
| | | | 359/619 |
| 2009/0135335 A1* | 5/2009 | Lee | G02B 5/045 |
| | | | 349/64 |
| 2010/0027240 A1* | 2/2010 | Chang | F21V 5/00 |
| | | | 362/97.1 |
| 2010/0033952 A1* | 2/2010 | Chang | G02F 1/133606 |
| | | | 362/97.1 |
| 2010/0232142 A1* | 9/2010 | Kim | G02B 5/0242 |
| | | | 362/97.2 |
| 2012/0051044 A1* | 3/2012 | Akiyama | G03B 21/2013 |
| | | | 362/233 |
| 2012/0218641 A1* | 8/2012 | Kikuchi | G02B 3/0056 |
| | | | 359/619 |
| 2014/0133160 A1* | 5/2014 | Hong | G02B 3/0056 |
| | | | 362/330 |
| 2014/0140068 A1 | 5/2014 | Eom et al. | |

FOREIGN PATENT DOCUMENTS

| | | |
|---|---|---|
| EP | 2726776 A1 | 5/2014 |
| JP | 2009-210749 A | 9/2009 |
| JP | 2010-039091 A | 2/2010 |
| JP | 2010-204156 A | 9/2010 |
| JP | 2010-217660 A | 9/2010 |
| JP | 4551485 B2 | 9/2010 |
| KR | 10-2009-0020961 A | 2/2009 |
| TW | I289683 B | 11/2007 |
| TW | 200905257 A | 2/2009 |
| TW | 200937083 A | 9/2009 |

OTHER PUBLICATIONS

European Search Report in European Application No. EP-12811855.1.
International Search Report in International Application No. PCT/KR2012/005361, filed Jul. 6, 2012.
Office Action dated May 4, 2016 in Chinese Application No. 201280034668.7.
Office Action dated Dec. 1, 2014 in Taiwanese Application No. 101124383.

* cited by examiner $$Sag = \frac{HEIGHT}{DIAMETER}$$

LIGHTING DEVICE

CROSS-REFERENCE TO RELATED APPLICATIONS

This application is the U.S. national stage application of International Patent Application No. PCT/KR2012/005361, filed Jul. 6, 2012, which claims priority to Korean Application No. 10-2011-0068605, filed Jul. 11, 2011, the disclosures of each of which are incorporated herein by reference in their entirety.

TECHNICAL FIELD

Exemplary embodiments of the present invention relate to a lighting device capable of reducing UGR (Unified Glare Rating)

BACKGROUND ART

Generally, lighting is an activity or a function to brighten a certain place using various kinds of light sources with a particular purpose. Lighting is mostly used to make an environment brighter in the night or in the dark.

FIG. 1 is a cross-sectional view illustrating a flat light device according to an exemplary embodiment of a conventional art. Referring to FIG. 1, the light device according to the exemplary embodiment of the conventional art includes a light source 10 and a louver or a reflecting shade 20. As for the light sources 10, an incandescent light bulb, an LED, a CCFL, or the like may be used Referring to FIG. 1, light at angles denoted with dotted lines causes visually discomfort to a person when it is transferred to the person. Such a lighting device may reduce the UGR mechanically, but cannot be aesthetic or perfect flat lighting.

FIG. 2 is a cross-sectional view illustrating a flat lighting device according to another exemplary embodiment of a conventional art. Referring to FIG. 2, a lighting device 30 includes a light source 10 and a diffusion plate 40 for diffusing light emitted from the light source 10. The light emitted from the light source 10 is discharged to the outside through the diffusion plate 40. The diffusion plate is used for reducing a hot spot of the light source and emitting uniformly light. Even if the diffusion plate 40 is used, as shown in FIG. 2, the light at the angles denoted with the dotted lines still gives discomfort to the eyes of a person. That is, the diffusion plate 40 scatters the light up to a direction in which the UGR is high enough causing fatigue of the eyes due to the glaring. Thus, so such a diffusion plate fails to meet the standard of an indoor flat lighting device.

Accordingly, it is important to reduce the glaring to the eyes in indoor flat lighting. The degree of discomfort due to the glaring to the eyes is represented using a constant called UGR (Unified Glare Rating). That is, the UGR is a value calculated by quantifying the degree of discomfort giving to the user of a lighting device.

The UGR is calculated as the value of a light flux emitted at the angle between 65 deg to 90 deg when a direction facing a bottom surface from a ceiling provided with a lighting device is set to 0 deg and a direction parallel to the ceiling is set to 90 deg. That is, the glaring to the eyes will reduce when the light flux at 65 deg to 90 deg is reduced. In Europe and US, an indoor lighting device has to be less than 19 of UGR.

DISCLOSURE OF INVENTION

Technical Problem

Like this, most currently used indoor flat lighting devices reduce a light spreading angle into a broad range which affects the UGR, by using a reflecting shade or a louver, or burying the whole lighting device. According to the conventional art, even though the diffusion plate is used, the influence of a hot spot may be reduced, but which is still not conformable with the UGR standard of less than 19.

Solution to Problem

As aspect of exemplary embodiments of the present invention may provide a lighting device capable of reducing UGR (Unified Glare Rating).

According to an aspect of the present invention, there is provided a lighting device including: a diffusion unit for diffusing and emitting light incident from a light source; and a condensing unit located on a light emitting surface of the diffusion part, and including a micro lens array of lenses having sag determined depending on one of a light emitting area of the lighting device and the total light flux of the lighting device.

The lighting device may further include an spaced part between the diffusion unit and the condensing unit, which is resulted from that the diffusion unit and the condensing unit are bonded to each other without an adhesive.

The lighting device may further include a support frame for supporting to maintain a bonded state between the diffusion unit and the condensing unit.

The lighting device may further include another spaced part formed by partially interposing an adhesive between the diffusion unit and the condensing unit.

An area of the spaced part may be adjusted using at least one among the speed of a spray, the size and the position of a nozzle, injection pressure, an injection area and a distance up to a target, which are related to providing the adhesive.

Advantageous Effects of Invention

In accordance with exemplary embodiments of the present invention, the micro lens array of the lenses having the sag determined depending on one of the light emitting area and the total light flux of the lighting device is patterned on a transparent plate to thereby be used in the lighting device, and thus the lighting device can reduce the light flux emitted at the angle between 65 deg to 90 deg, thereby meeting an UGR condition.

BRIEF DESCRIPTION OF DRAWINGS

The above and other aspects, features and advantages of certain exemplary embodiments of the present invention will be more apparent from the following description taken in conjunction with the accompanying drawings, in which.

MODE FOR THE INVENTION

Figure 1:
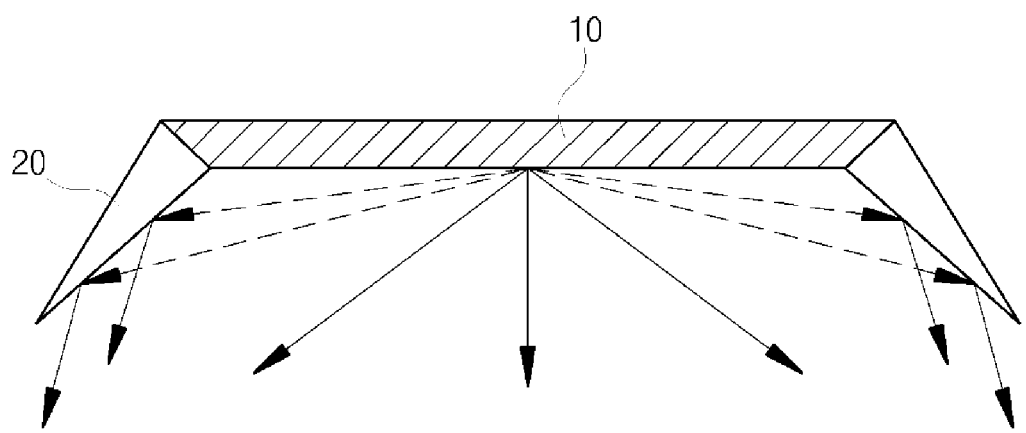
FIG. 1 is a cross-sectional view illustrating a flat lighting device according to an exemplary embodiment of a conventional art.
Figure 2:
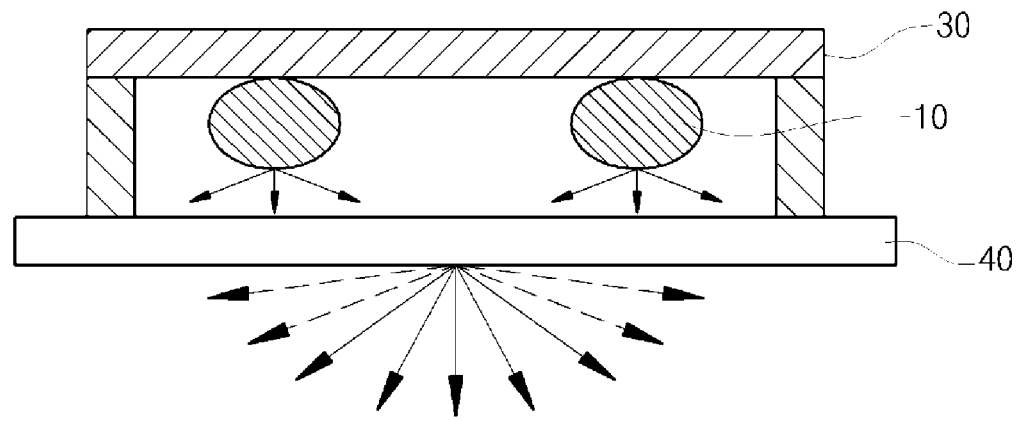
FIG. 2 is a cross-sectional view illustrating a flat lighting device according to another exemplary embodiment of the conventional art.

A lighting device according to preferred exemplary embodiments of the present invention will now be described more fully hereinafter with reference to the accompanying drawings. Meanwhile, when it is determined that specific descriptions regarding publicly known relevant functions or configurations unnecessarily are beside main points of the present invention, corresponding descriptions are omitted.

Furthermore, sizes of each element in the drawings can be exaggerated for the convenience of the descriptions, which does not reflect the actual sizes of the corresponding elements.

Figure 3:
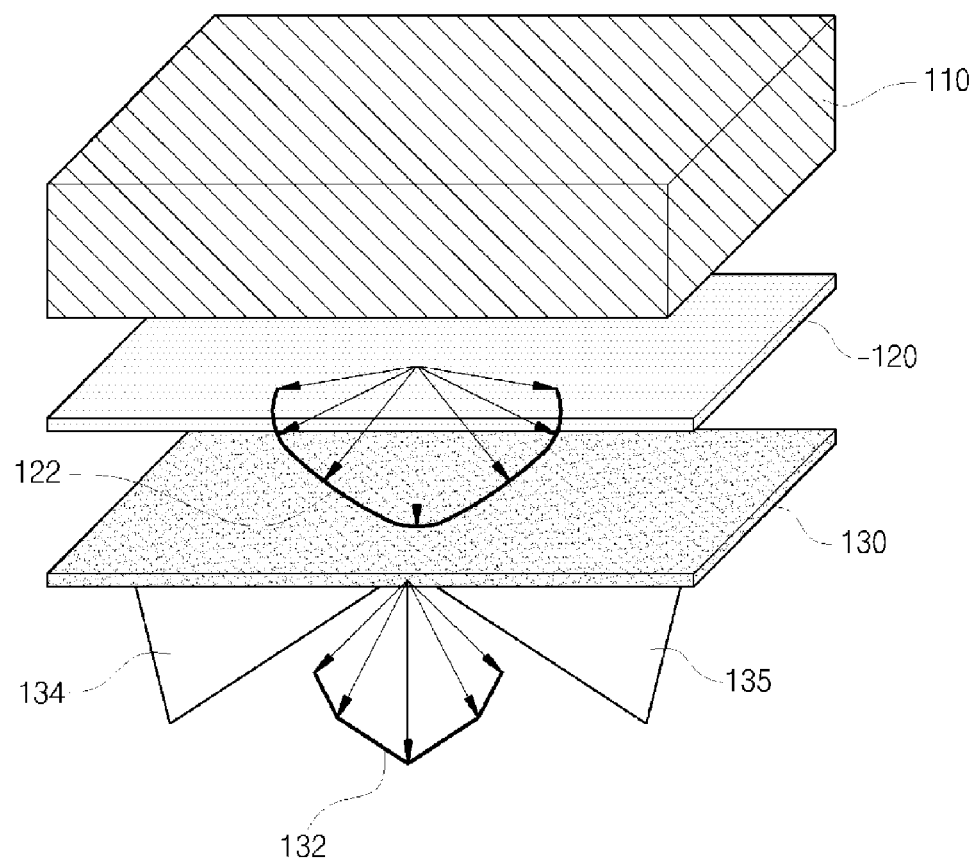
FIG. 3 is a disassembled perspective view illustrating a lighting device according to an exemplary embodiment of the present invention.

FIG. 3 is a disassembled perspective view illustrating a lighting device according to an exemplary embodiment of the present invention.

Referring to FIG. 3, the lighting device according to the present exemplary embodiment of the invention includes a light source unit 110, a diffusion unit 120, and a condensing unit 130.

According to the present exemplary embodiment, the light source unit 110 may include a frame in which light sources are mounted. The light source unit 110 may have a flat shape. The diffusion unit is attached onto a light radiating surface of the light source unit 110.

The diffusion unit 120 may be implemented as a substrate or a sheet for diffusing light. Furthermore, according to the present exemplary embodiment, the diffusion unit 120 may be implemented by bonding the sheet and the substrate. The diffusion unit 120 diffuses and radiates light incident through one surface thereof Generally, because such a diffusion unit 120 scatters light up to a direction in which high UGR is generated, glaring to the eyes occurs, and thus a user s eyes become tired. In the present exemplary embodiment of the invention, the condensing unit 130 is used to narrow the range of a radiation angle of the light radiated through the diffusion unit 120.

Figure 4:
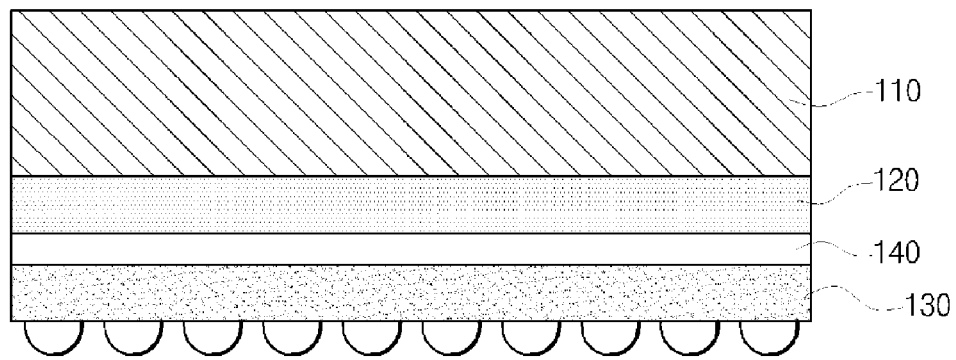
FIG. 4 is a cross-sectional view illustrating a lighting device according to another exemplary embodiment of the present invention.

FIG. 4 is a cross-sectional view illustrating a lighting device according to another exemplary embodiment of the present invention.

Referring to FIG. 4, the lighting device according to the present exemplary embodiment of the invention may include the light source unit 110, the diffusion unit 120 and the condensing unit 130. One surface of the diffusion unit 120 is bonded to one surface of the light source unit 110. Furthermore, the condensing unit 130 is bonded to another surface of the diffusion unit 120. In this case, when the diffusion unit 120 and the condensing unit 130 are bonded without an adhesive therebetween, a spaced part 140 forming an air gap is provided between the diffusion unit 120 and the condensing unit 130. For this, the lighting device may include a support frame (not drawn) for supporting a state in which the diffusion unit 120 and the condensing unit 130 are bonded each other. However, the present invention is not limited to this, all means for maintaining the bonded state of the diffusion unit 120 and the condensing unit 130 without the adhesive may be used FIG. 5 is a cross-sectional view illustration a lighting device according to still another exemplary embodiment of the present invention.

Figure 5:
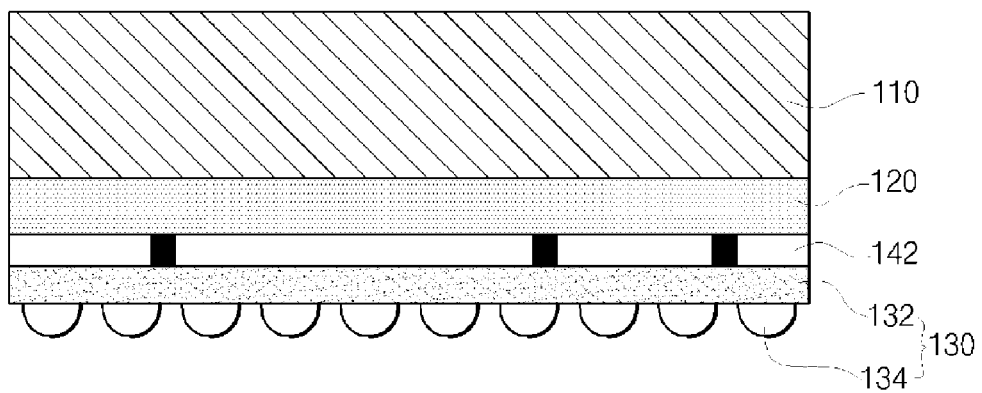
FIG. 5 is a cross-sectional view illustrating a lighting device according to still another exemplary embodiment of the present invention.

Referring to FIG. 5, the lighting device according the still another exemplary embodiment of the present invention has the same configurations as the exemplary embodiment of the present invention of FIG. 4 except for the spaced part 142. Specifically, the diffusion unit 120 and the condensing unit 130 are bonded via an adhesive 200. Here, a surface adjacent to the condensing unit 130 of the diffusion unit 120 or a surface bordered to the diffusion unit 120 of the condensing unit 130 is not entirely coated with the adhesive 200. That is, the adhesive 200 is provided to the surface adjacent to the condensing unit 130 of the diffusion unit 120 or a part of the surface bordered to the diffusion unit 120 of the condensing unit 130. Thus, the spaced part 142 is formed between the diffusion unit 120 and the condensing unit 130. That is, the adhesive is partially interposed between the diffusion unit and the condensing unit to thereby form the spaced part 142. Also, the spaced part 142 applies the adhesive 200 to the surface adjacent to the condensing unit 130 of the diffusion unit 120 or the surface bordered to the diffusion unit 120 of the condensing unit 130 using a spray method, and is implemented by bonding the diffusion unit 120 and the condensing unit 130.

An area of the spaced part may be adjusted using at least one among the speed of a spray, the size and the position of a nozzle, injection pressure, an injection area and a distance up to a target, which are related to providing the adhesive 200. Furthermore, an amount of the adhesive may determined so that an area of the adhesive occupying a light radiating surface of the diffusion unit 120 amounts for less than 70% to the total area of the diffusion unit.

According to still another exemplary embodiment, a light diffusion member instead of the adhesive 200 may be used At this time, a plurality of beads may be used as the light diffusion member. In this case, after the adhesive is coated with the beads, the beads may be interposed between the diffusion unit 120 and the condensing unit 130, or after the adhesive is coated with one surface of the diffusion unit 120 and the condensing unit 130, the beads may be interposed therebetween.

According to still another exemplary embodiment, the surface adjacent to the condensing unit 130 of the diffusion unit 120 or the surface bordered to the diffusion unit 120 of the condensing unit 130 are processed according to a sand blast method so that the surface adjacent to the condensing unit 130 of the diffusion unit 120 or the surface bordered to the diffusion unit 120 of the condensing unit 130 may have a roughness pattern having surface roughness. Furthermore, the roughened pattern may be implemented in a structure having a concave part in various groove forms. Also, due to this concave part, the spaced part may be formed between the diffusion unit 120 and the condensing unit 130.

The spaced part 140 operates so that light radiated from the diffusion unit 120 and incident to the condensing unit 130 is refracted. That is, the light radiated from the diffusion unit 120 is refracted by the spaced part corresponding to an air layer, and thus is incident to the condensing unit 130. Thus, the spaced part 140 reduces a radiation angle of the light radiated from the diffusion unit 120. Also, the light refracted through the spaced part 140 is incident to the condensing unit 130.

To narrow a range of the radiation angle of the light, the condensing unit 130 is located on or attached to a surface on which the light of the diffusion unit 120 is radiated. As illustrated in FIG. 3, the light emitted throughout a broad angle from the diffusion unit 120 is incident to the condensing unit 130.

The range of the radiation angle of the light radiated through the condensing unit 130 is narrower or smaller than that of the light radiated through the diffusion unit 120. For example, the range of the radiation angle of the light radiated through the diffusion unit 120 is about 180 degrees 122, but, the range of the radiation angle of the light radiated through the condensing unit 130 is about 130 degrees 132. In other words, when a direction facing a bottom surface from a ceiling in which a lighting device is installed is set to 0 degree, and a direction parallel to the ceiling is set to 90 degree, from the range of an angle in which high UGR is generated, namely, the range of an angle at 65 deg to 90 deg 134 and the range of an angle at −65 deg to −90 deg 135, light is hardly radiated.

Such a condensing unit 130 may be implemented using a light functional plate or a sheet, or may be formed or manufactured using a plate in which a micro lens array (MLA) is patterned. The micro lens array may be implemented of a resin on a plate formed of PC (Polycarbonate) or PMMA (polymethylmethacrylate). In this case, the lenses of the micro lens array have sag determined based on an area of the lighting device and the intensity of light of the lighting device.

Figure 6:
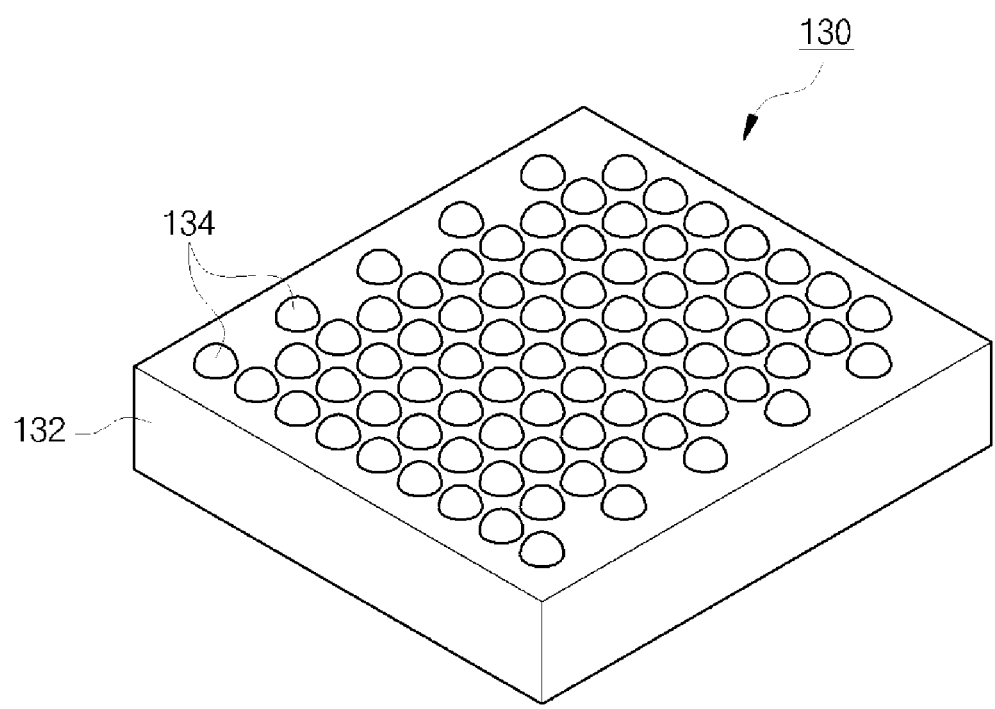
FIG. 6 is a perspective view illustrating a condensing unit according to still another preferred exemplary embodiment of the present invention.
Figure 7:
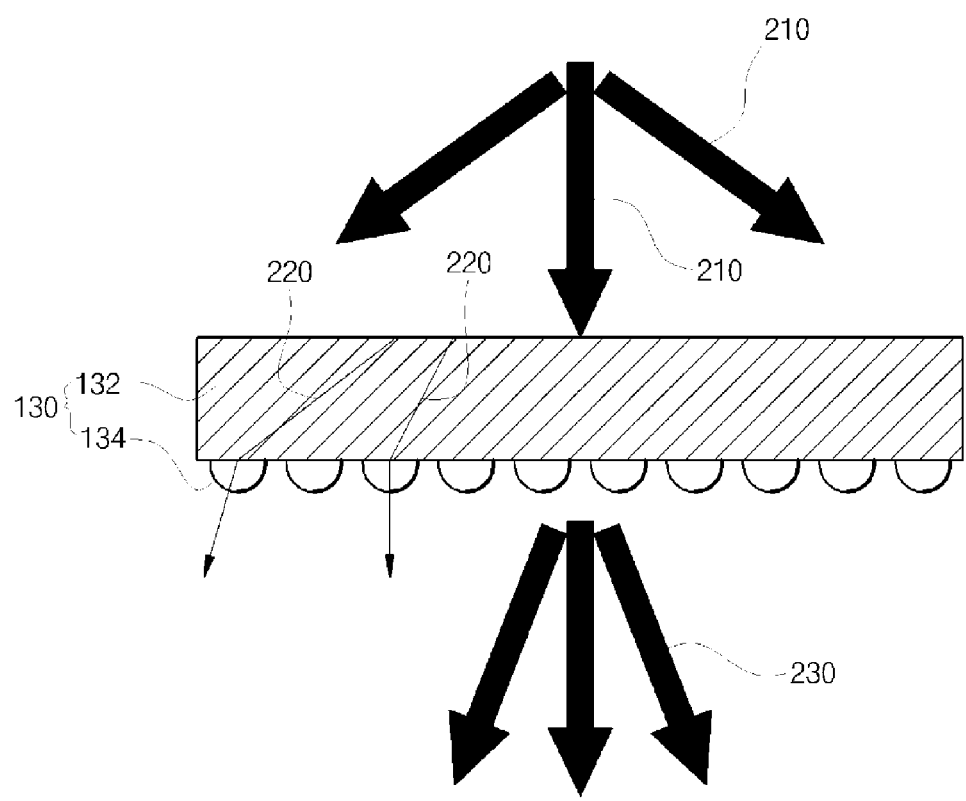
FIG. 7 is a view illustrating a state in which light is emitted through the condensing unit of FIG. 6.

FIG. 6 is a perspective view illustrating a diffusion unit according to still another preferred exemplary embodiment of the present invention, and FIG. 7 is a view illustrating a state in which light is radiated through the diffusion unit of FIG. 6.

The condensing unit 130 may be formed by patterning the micro lens array (MLA) on a plate 132. As illustrated in FIG. 6, the micro lens array may include a plurality of lenses 134. The plurality of lenses may be formed on the plate 132 depending on a previously determined pattern. For example, the plurality of lenses may be tightly or thickly located or may be thinly located on the plate 132. In other words, a distance (an arrangement density) between the plurality of lenses may be adjusted. Furthermore, depending on the distance between the lenses, URG may be changed Moreover, light 210 radiated from the diffusion unit 120 is incident to the condensing unit 130. As illustrated in FIG. 7, the light 210 is incident to the plate 132 and is radiated through the plurality of lenses 134. The micro lens array, namely, the plurality of lenses 134, refract light. That is, light 220 incident to the plate 132 of the condensing unit 130 is refracted by the lenses 134 to the direction facing the bottom surface from the ceiling in which the lighting device is installed.

In this case, the higher sag of the micro lenses 134 is, the more light is refracted.

Figure 8:
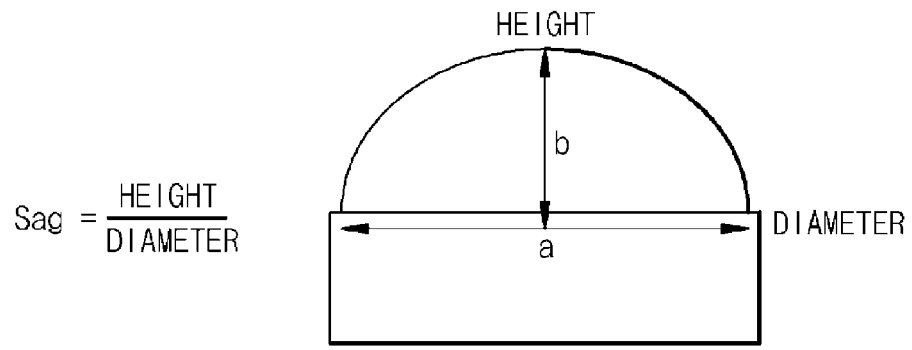
FIG. 8 is a view illustrating sag of lenses.

FIG. 8 is a view illustrating sag of lenses.

As illustrated in FIG. 8, the sag represents a height b of the lens to a diameter a of the lens. The sag may be expressed by the following mathematical formula.

Sag=height of lens/diameter of lens [Mathematical Formula 1]

The higher the sag of each lens of the micro lens array (MLA) is, the more light is refracted to the direction facing the bottom surface from the ceiling, and thus URG is reduced.

However, the sag of the lenses of the micro lens array generates a side light-leakage phenomenon called a side-lobe at a predetermined section, which does not satisfy an UGR condition. Furthermore, as the sag of the lenses becomes higher, a recycle phenomenon that light returns in an incoming direction of the light is very increased, so that a lot of reflections are generated, which results in a reduction in light efficiency.

That is, when the sag of the lenses is too high (when the sag is more than 0.35), the UGR condition is satisfied, but light efficiency is reduced. Furthermore, when the sag of the lenses is too low (when the sag is less than 0.1), a reduction in light efficiency is minimized, but the UGR condition is not satisfied.

Like this, to reduce UGR, if the range of the radiation angle of light becomes excessively narrow, namely, if the sag of the lenses is too high, the light efficiency is reduced. Furthermore, an area irradiated with light, namely, a light emitting area, is also reduced. In this case, compared with a lighting device with the low sag of the lenses, more lighting devices are required to illuminate the same area. That is, in general, the higher the sag of the lenses is, the UGR is reduced, but the light efficiency is also reduced (less than 90% compared with the diffusion plate).

Accordingly, the sag of the lenses of the micro lens array, which minimizes the reduction in light efficiency and maximizes the area irradiated with the light while meeting UGR standards, should be determined.

That is, according to the present invention, the sag of the lenses of the micro lens array is determined depending on an area of the lighting device and the intensity of light emitted from the lighting device, namely, the total light flux.

Figure 9:
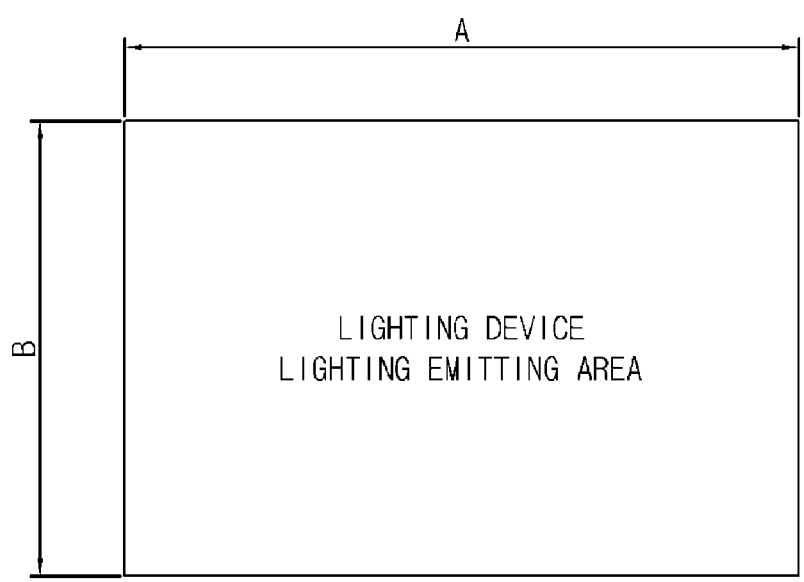
FIG. 9 is a view illustrating a light emitting area of the lighting device.

FIG. 9 is a view illustrating a light emitting area of the lighting device.

Referring to FIG. 9, a flat lighting device has a light emitting area provided by a horizontal length A and a vertical length B. The flat lighting device has been generally manufactured in multiples of 300 mm Thus, the flat lighting device may have the light emitting area as shown in the following Table 1 depending on the horizontal length A and the vertical length B.

TABLE 1

| | Light Emitting Area of Lighting Device (mm²) | | | |
| --- | --- | --- | --- | --- |
| | A | | | |
| B | 0~300 | 300~600 | 600~900 | 900~1200 or more |
| 0~300 | ~9000 | ~180000 | ~270000 | 270000 or more |
| 300~600 | 90000~180000 | 9000~36000 | 180000~540000 | 270000~720000 |

TABLE 1-continued

| | Light Emitting Area of Lighting Device (mm²) | | | |
|---|---|---|---|---|
| | A | | | |
| B | 0~300 | 300~600 | 600~900 | 900~1200 or more |
| 600~900 | 180000~270000 | 18000~54000 | 360000~810000 | 540000~1080000 |
| 900~1200 or more | 270000 or more | 27000~72000 | 540000~1080000 | 810000~1440000 |

The sag of the lenses of the micro lens array determined based on the light emitting area and the total light flux of the lighting device may be determined as shown in the following Table 2.

TABLE 2

| Total Light Flux | Light Emitting Area of Lighting Device | Section of Sag |
|---|---|---|
| 4000 lm or more | 360000 mm² or more | Selectively between 0.1 to 0.5 |
| | 360000 mm² or less | 0.25 or more |
| 4000 lm or less | 360000 mm² or more | 0.25 or less |
| | 360000 mm² or less | Selectively between 0.1 to 0.5 |

Referring to table 2 above, in a case where the lighting device shows the total light flux of more than 4000 lm, and has the light emitting area of more than 360000 mm², the lenses of the micro lens array are determined within a range between 0.1 to 0.5.

Like this, according to the present exemplary embodiment of the invention, the lenses of the micro lens array are determined depending on the light emitting area and the total light flux of the lighting device.

Figure 10:
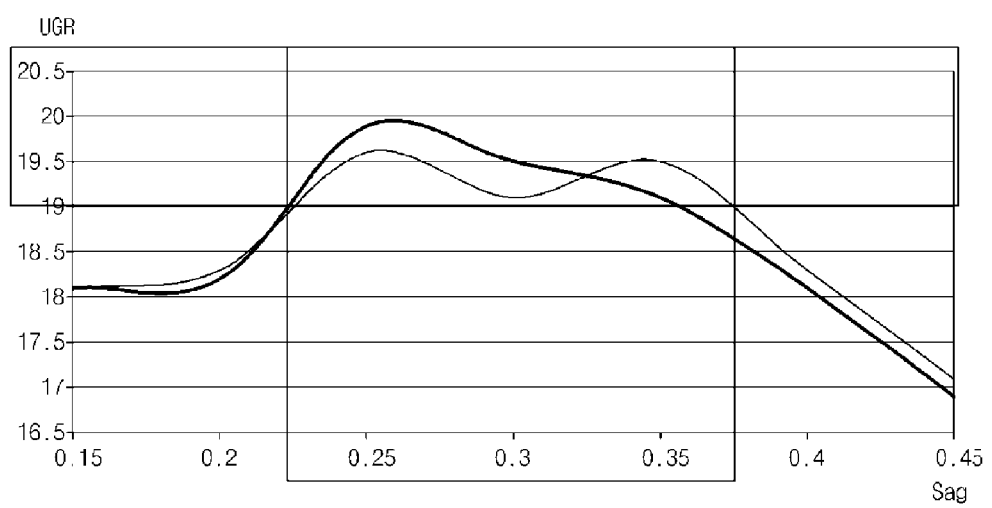
FIG. 10 is a graph showing a relation between URG and sag.
Figure 11:
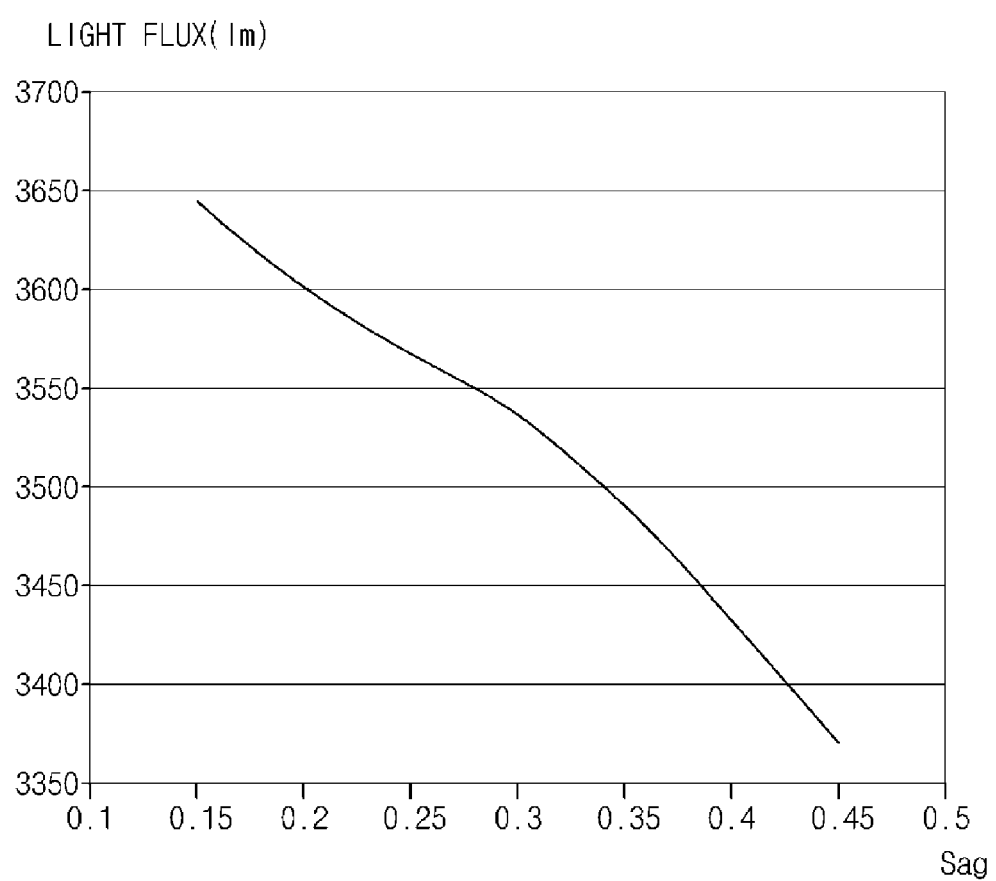
FIG. 11 is a view illustrating a relation between light efficiency and sag.

FIG. 10 is a graph showing a relation between URG and sag, and FIG. 11 is a view showing a relation between light efficiency and sag. FIG. 10 and FIG. 11 show a case in which an area of the lighting device is 600×600 mm, and brightness of the lighting device is 4000 lumen.

Referring to FIG. 10, a section of the sag of the lenses wherein the UGR is less than 19 which meets the indoor lighting condition is in a range of 01. to 0.22 or 0.35 to 0.5. In a section in which the sag of the lenses is in a range of 0.25 to 0.35, due to the side lobe (light-leakage phenomenon at the angle between 65 deg to 90 deg), the UGR increases. Accordingly, the section of the sag of the lenses ranging from 0.25 to 0.35 does not meet the indoor lighting condition that the UGR is less than 19.

Furthermore, Referring to FIG. 11, the higher the sag of the lenses is, the light flux is lowered, thereby reducing light efficiency. Accordingly, in consideration of the light efficiency, the sag of the lenses may be determined within a range of 0.1 to 0.25.

Like this, when the sag of the lenses is determined to be low, namely, within the range of 0.1 to 0.25, the UGR is reduced and the reduction in light efficiency is minimized.

However, the sag of the lenses may be differently determined depending on an area and light intensity of the lighting device. Accordingly, the sag of the lenses of the micro lens array is determined depending on the area of the lighting device and the light intensity of the lighting device.

As previously described, in the present exemplary embodiment of the invention, by using the plate on which the micro lens array is patterned, the lighting device can minimize the reduction in light efficiency and can reduce the URG.

Hereinafter, a method of manufacturing the condensing unit according to the present exemplary embodiment of the invention as described above will be explained.

A first method forms a micro lens array by preparing a transparent plate, and molding the transparent plate by applying heat and pressure to the transparent plate. The first method includes a press method, a direct process method and the like. A second method forms a micro lens array by preparing a transparent plate, and coating the transparent plate with an UV hardening resin, for example, a resin, and hardening it using heat or light. The second method includes an imprinting method, a direct roll printing method and the like. Furthermore, the transparent plate or a sheet may be manufactured of PC, PMMA, PET (Polyethylene terephthalate) films and the like.

Thus, the micro lens array according to the present exemplary embodiment of the invention has a high replication ratio and is also easy to process even in any process. Furthermore, the loss of an original material can be also minimized.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A lighting device, comprising:
a light source unit;
a diffusion unit for diffusing light emitted from the light source unit; and
a condensing unit including a microlens array on a light emitting surface of the diffusion unit;
wherein the microlens array includes a plurality of lenses having a sag determined based on any one of a light emitting area and a total luminous flux, and
wherein the lenses of the plurality of lenses are spaced apart from each other.

2. The lighting device of claim 1, wherein the diffusion unit and the condensing unit are bonded so as to form a spaced part.

3. The lighting device of claim 2, further comprising a support frame between the diffusion unit and the condensing unit.

4. The lighting device of claim 2, further comprising an adhesive material interposed between the diffusion unit and the condensing unit.

5. The lighting device of claim 4, wherein a coating area of the adhesive material is less than 70% of a total area of the light emitting surface of the diffusion unit.

6. The lighting device of claim 2, further comprising a light diffusion member between the diffusion unit and the condensing unit.

7. The lighting device of claim 1, further comprising a roughness pattern having roughness on one surface or both surfaces of a surface of the diffusion unit and a surface of the condensing unit which are opposite to each other.

8. The lighting device of claim 1, wherein the sag ranges from 0.1 to 0.25.

9. The lighting device of claim 8, wherein a unified glare rating (UGR) is 19 or below.

10. The lighting device of claim 9, wherein the condensing unit enables the luminous flux emitted from the light source unit to be reduced at 65-90 degrees.

11. The lighting device of claim 10, wherein the condensing unit is disposed on a plate.

12. The lighting device of claim 11, wherein the plate contains any one material of polycarbonate (PC), polymethylmethacrylate (PMMA), and polyethylene terephthalate (PET).

13. The lighting device of claim 11, wherein the microlens array is made of a different material from that of the plate.

14. The lighting device of claim 13, wherein the microlens array is made of a photocurable or thermosetting resin.

15. The lighting device of claim 11, wherein the microlens array is directly formed on the plate.

16. A lighting device, comprising:
a light source unit;
a diffusion unit for diffusing light emitted from the light source unit;
a condensing unit including a microlens array on a light emitting surface of the diffusion unit; and
a light diffusion member between the diffusion unit and the condensing unit;
wherein the microlens array includes a plurality of lenses having a sag determined based on any one of a light emitting area and a total luminous flux,
wherein the diffusion unit and the condensing unit are bonded so as to form a spaced part, and
wherein the light diffusion member has a bead structure.

17. The lighting device of claim 16, wherein the light diffusion member is fixed by an adhesive material.

18. A lighting device, comprising:
a light source unit;
a diffusion unit for diffusing light emitted from the light source unit; and
a condensing unit on a light emitting surface of the diffusion unit;
wherein the condensing unit includes a first concave part on a first surface facing the light emitting surface of the diffusion unit,
wherein the condensing unit includes a plurality of lenses on a second surface opposite to the first surface, and
wherein the plurality of lenses has a sag determined based on any one of a light emitting area and a total luminous flux.

19. The lighting device of claim 18, wherein the diffusion unit includes a second concave part on the light emitting surface.

* * * * *